No. 740,347. PATENTED SEPT. 29, 1903.
J. J. WOOD.
ELECTRIC LIGHT FIXTURE.
APPLICATION FILED MAR. 14, 1903.
NO MODEL.

WITNESSES:
Fred White
Rene' Kruise

INVENTOR:
James J. Wood,
By Attorneys,

No. 740,347.

Patented September 29, 1903.

UNITED STATES PATENT OFFICE.

JAMES J. WOOD, OF FORT WAYNE, INDIANA.

ELECTRIC-LIGHT FIXTURE.

SPECIFICATION forming part of Letters Patent No. 740,347, dated September 29, 1903.

Application filed March 14, 1903. Serial No. 147,738. (No model.)

*To all whom it may concern:*

Be it known that I, JAMES J. WOOD, a citizen of the United States, residing at Fort Wayne, in the county of Allen and State of Indiana, have invented certain new and useful Improvements in Electric-Light Fixtures, of which the following is a specification.

This invention relates to electric-light fixtures especially adapted for use in tunnels or subways or analogous locations. It is desirable in such locations to throw the light in opposite directions across the tunnel or space to be illuminated without throwing the light in a direction longitudinally of the tunnel or other space. This is important in a railway tunnel or subway in order that the tunnel may be illuminated without throwing the light into the eyes of the motorman of an approaching car or train.

The preferred embodiment of my invention is shown in the accompanying drawings, wherein—

Figure 1:
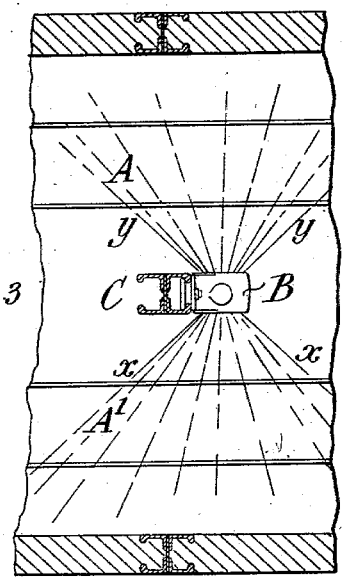
Figure 2:
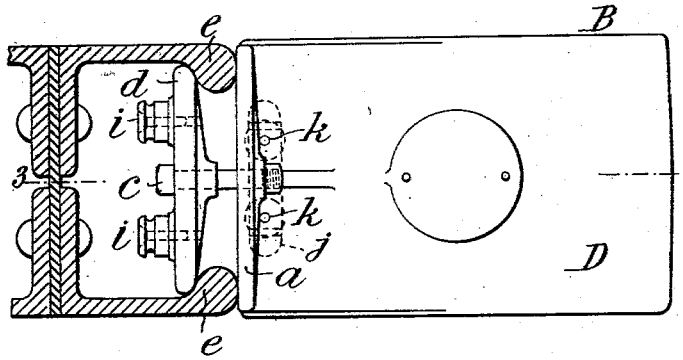
Figure 3:
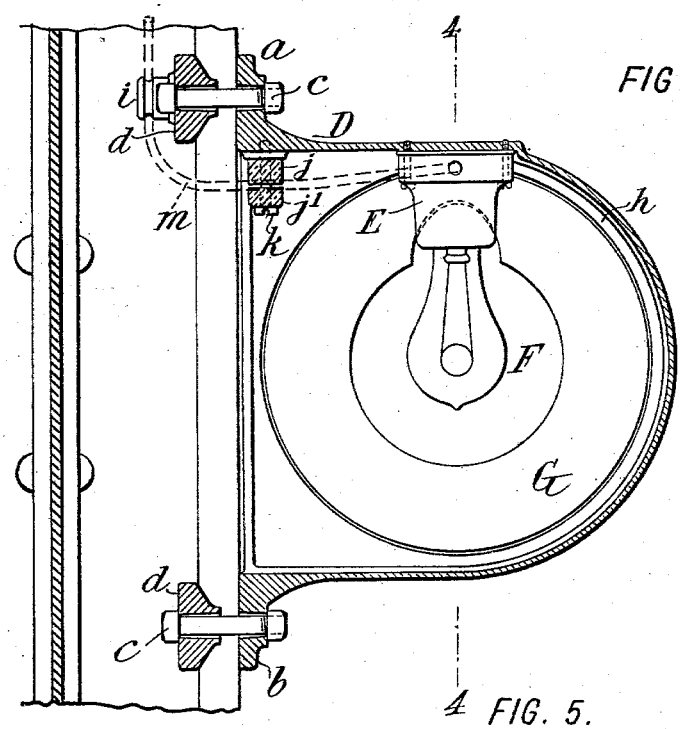
Figure 4:
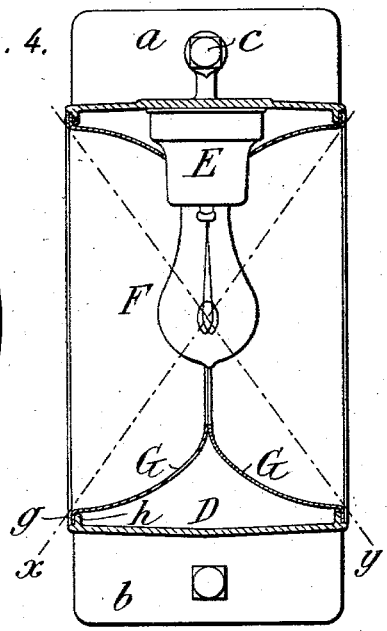
Figure 5:
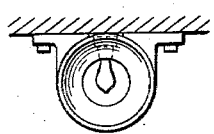

Figure 1 is a plan showing a fragment in horizontal section of a double-track tunnel with one of my light-fixtures applied to light both tracks. Fig. 2 is a plan of the fixture on a larger scale, showing it fastened to a pillar of the tunnel, which pillar is shown in section. Fig. 3 is a vertical mid-section of the fixture on the line 3 3 in Fig. 2. Fig. 4 is a vertical transverse section on the line 4 4 in Fig. 3. Fig. 5 is an elevation showing the fixture attached to the roof of a tunnel.

Referring to Fig. 1, A and A' are the tracks of the tunnel, B is the electric-light fixture as a whole, and C is a post or pillar of the tunnel to which the fixture is clamped. In Fig. 2 the fixture and a part of the pillar are shown on a larger scale.

The fixture comprises an outer casing D of annular form, having suitable means for attachment to the pillar and adapted to support within it the socket E of an electric lamp F, preferably an incandescent lamp. The lamp is supported in the middle of the space within the casing, as shown in Fig. 4, and in such position that the loop of its filament is preferably or approximately in the center of the casing. The casing is preferably of approximately circular form, with the lamp loop or arc as its center. When designed to be applied to an upright or pillar of the tunnel, as shown, it is preferably formed with upwardly and downwardly projecting flanges $a\ b$ on the side against the pillar, through which flanges fastening-bolts $c\ c$ may be passed to fasten the casing to the pillar. With the shape of pillar shown I provide a fastening device or attachment, consisting of a cross bar or plate $d$, the ends of which bear against inturned flanges $e\ e$ on the pillar, the bolts $c\ c$ passing through the middles of these plates. The casing may be open on the side toward the pillar or other support between the flanges $a\ b$, as shown, so as to facilitate access to the wires and the insulating-cleats or the like.

The casing D has openings on opposite sides through which the light from the lamp may radiate, as shown by the dotted radial lines in Fig. 1, in order to illuminate both tracks of the tunnel. Between these opposite openings the casing for its entire width serves as a screen to cut off the light, and thereby to protect the eyes of the motormen. To prevent waste of the light radiated throughout this intermediate zone—that is to say, the light between the lines $x\ y$ in Figs. 1 and 4—the casing is fitted with a double reflector constructed, preferably, of two single concave mirrors G G of the construction shown best in Fig. 4. These mirrors are cut out centrally, so as to form annular reflectors, as shown. They are formed with external flanges $a\ a$, which are fastened by screws or otherwise to inturned flanges $h\ h$ on the casing D. The double reflector is hence mounted in the casing on a transverse axis. As space laterally is limited, the light-fixture B as a whole is made, preferably, no wider than the pillar C. It is shown of the same width in Figs. 1 and 2. Obviously instead of fastening the fixture to an upright column it may be fastened to any other suitable part of the structure—as, for example, to the roof of the tunnel—by simply turning the side having the flanges $a\ b$ uppermost, as shown in Fig. 5, and applying any suitable fastening device. In such case the lamp-socket may be applied on the upper side, as indicated.

For conducting the circuit-wires to the lamp-socket I provide with the construction shown in Figs. 2, 3, and 4 for a conveniently-arranged series of supports for the wires. On the fastening-plate $d$ are fastened insulators $i\ i$. Within the casing D, and preferably against the top plate thereof, are placed insulating-cleats $j\ j'$, which are fastened and clamped together by screws $k\ k$. The two circuit-wires are carried from any suitable point above down within the hollow of the pillar and are first fastened to the insulators $i\ i$, from which they are led, as shown by dotted lines $m$, between the cleats $j\ j'$ and thence to the socket E. The back of the casing, which lies against the supporting-pillar or roof, is preferably open, as shown, to facilitate access to the cleats.

My invention is susceptible of considerable modification in its structural details, as will be apparent.

I claim as my invention—

1. The combination with a support in a tunnel or the like, of an electric-light fixture comprising an annular casing open on opposite sides, having fastening means for attaching its back to said support, a lamp mounted within said casing, and a double reflector fixed in said casing on a transverse axis to reflect the light from said lamp out through the opposite open sides, said fixture mounted on said support with the axis of said reflector transverse to the tunnel, whereby to direct the light laterally of the tunnel without throwing it longitudinally thereof.

2. The combination with a support in a tunnel or the like, of an electric-light fixture comprising a casing open on opposite sides and the back, a lamp mounted within said casing, and means for fastening said casing to said support with its back against the support so as to radiate the light through the open sides of the casing laterally of the tunnel without throwing the light longitudinally of the tunnel.

3. An electric-light fixture comprising a casing open on opposite sides, and having exterior flanges, a lamp mounted within said casing, so that its light may radiate to opposite sides through the open sides of the casing, and attaching means comprising a plate adapted to engage flanges on a fixed support, and bolts for drawing said plate to the flanges on the casing.

4. An electric-light fixture comprising a casing D, having circular openings on opposite sides, a lamp mounted within said casing, and annular concave reflectors G G within said casing having outturned flanges $g$ fastened against the margins of said openings.

5. An electric-light fixture comprising a casing D open at the sides and having outturned flanges $a\ b$ at the back of the casing for attaching it to a support, a lamp-socket fastened within the casing, and insulating-cleats $j\ j'$ at the back of the casing, said casing being open at the back to permit the passage of circuit-wires leading to said socket and to facilitate access to said cleats.

6. An electric-light fixture comprising a casing D open at the sides and having at the back an outturned flange $a$ for fastening it to a support, a fastening-plate $d$ adapted to engage flanges on a fixed support, a bolt $c$ passing through said flange $a$ and clamping the plate $d$ and the flange together on said fixed support, insulators $i\ i$ on said plate, insulating-cleats $j\ j'$, and a lamp-socket fastened within the casing, the back of said casing being open to permit the passage of the circuit-wires to said socket and to facilitate access to said cleats, and whereby the wires may be supported by said insulators and cleats.

In witness whereof I have hereunto signed my name in the presence of two subscribing witnesses.

JAMES J. WOOD.

Witnesses:
EDWARD A. BARNES,
THOS. W. BEHAN.